US008860780B1

(12) United States Patent
Davey et al.

(10) Patent No.: US 8,860,780 B1
(45) Date of Patent: Oct. 14, 2014

(54) AUTOMATIC PIVOTING IN A WIDE-ANGLE VIDEO CAMERA

(75) Inventors: Mark Kenneth Davey, Bromley (GB); Marcus de Ferranti, Sydmonton (GB); Bartu Ahiska, Esher (GB)

(73) Assignee: Grandeye, Ltd., Guildford, Surrey (GB)

( * ) Notice: Subject to any disclaimer, the term of this patent is extended or adjusted under 35 U.S.C. 154(b) by 1776 days.

(21) Appl. No.: 11/236,328

(22) Filed: Sep. 27, 2005

Related U.S. Application Data

(60) Provisional application No. 60/613,828, filed on Sep. 27, 2004.

(51) Int. Cl.
*H04N 7/00* (2011.01)
*H04N 7/18* (2006.01)

(52) U.S. Cl.
CPC ........................................ *H04N 7/18* (2013.01)
USPC ............................................................ 348/39

(58) Field of Classification Search
CPC .............. H04N 7/181; H04N 13/0055; H04N 13/0497; H04N 13/044; H04N 13/0475
USPC ...................................................... 348/36–39
See application file for complete search history.

(56) References Cited

U.S. PATENT DOCUMENTS

| 3,725,563 | A | 4/1973 | Woycechowsky |
| 4,667,236 | A | 5/1987 | Dresdner |
| 4,728,839 | A | 3/1988 | Coughlan et al. |
| 4,763,280 | A | 8/1988 | Robinson et al. |
| 4,821,209 | A | 4/1989 | Hempel et al. |
| 5,027,287 | A | 6/1991 | Artigalas et al. |
| 5,049,988 | A * | 9/1991 | Sefton et al. .................. 348/143 |
| 5,185,667 | A | 2/1993 | Zimmermann |
| 5,321,776 | A | 6/1994 | Shapiro |
| 5,359,363 | A * | 10/1994 | Kuban et al. .................... 348/36 |
| 5,396,284 | A | 3/1995 | Freeman |
| 5,434,617 | A | 7/1995 | Bianchi |

(Continued)

FOREIGN PATENT DOCUMENTS

| EP | 1 341 383 A2 | 9/2003 |
| WO | WO 02/062056 A1 | 8/2002 |

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner* — Nhon Diep
(74) *Attorney, Agent, or Firm* — Robert O. Groover, III; Seth A. Horwitz; Gwendolyn S. S. Groover

(57) ABSTRACT

A system and method for automatically rotating a view of a wide-angle video camera. Preferred embodiments include automatic rotating of a stereographically projected view using a transformation engine which is capable of extracting a plurality of views under a remote pan tilt zoom (PTZ) control. In one example embodiment, when the center point of a video image of a selected view or region of interest is tilted through a direction which is perpendicular to the plane of the camera mounting (i.e., vertical when the camera is mounted on a ceiling) then the output image is automatically rotated 180 degrees about the pan axis. In preferred embodiments, the control circuitry then temporarily reverses interpretation of the tilt axis controls (for example, from PTZ controls), thereby allowing the view to tilt uninterrupted in the same direction past the auto-pivoting point.

28 Claims, 3 Drawing Sheets

(56) References Cited

U.S. PATENT DOCUMENTS

| | | |
|---|---|---|
| 5,495,292 A | 2/1996 | Zhang |
| 5,627,616 A | 5/1997 | Sergeant et al. |
| 5,666,157 A | 9/1997 | Aviv |
| 5,684,937 A | 11/1997 | Oxaal |
| 6,049,281 A | 4/2000 | Osterweil |
| 6,147,709 A | 11/2000 | Martin et al. |
| 6,215,519 B1 | 4/2001 | Nayar et al. |
| 6,243,099 B1 | 6/2001 | Oxaal |
| 6,344,852 B1 | 2/2002 | Zhu et al. |
| 6,392,693 B1 * | 5/2002 | Wakiyama et al. ........... 348/143 |
| 6,509,926 B1 | 1/2003 | Mills et al. |
| 6,724,421 B1 | 4/2004 | Glatt |
| 6,744,461 B1 * | 6/2004 | Wada et al. .................... 348/143 |
| 6,757,434 B2 | 6/2004 | Miled et al. |
| 6,763,068 B2 | 7/2004 | Oktem |
| 7,450,165 B2 | 11/2008 | Ahiska |
| 7,490,422 B1 * | 2/2009 | Chen ............................... 38/75 |
| 7,528,881 B2 | 5/2009 | Ahiska |
| 7,529,424 B2 | 5/2009 | Ahiska |
| 7,990,422 B2 | 8/2011 | Ahiska |
| 2003/0128756 A1 | 7/2003 | Oktem |
| 2005/0007453 A1 | 1/2005 | Ahiska |
| 2009/0102950 A1 | 4/2009 | Ahiska |
| 2009/0204920 A1 * | 8/2009 | Beverley et al. .............. 715/768 |

OTHER PUBLICATIONS

Y. Yardimci, I. Yilmaz, A. E. Cetin, "Correlation Tracking Based on Wavelet Comain Information," Proceedings of SPIE vol. #5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. on Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

AUTOMATIC PIVOTING IN A WIDE-ANGLE VIDEO CAMERA

CROSS-REFERENCE TO RELATED APPLICATIONS

This application claims priority from U.S. provisional patent application 60/613,828 filed Sep. 27, 2004, which is hereby incorporated by reference.

BACKGROUND AND SUMMARY OF THE INVENTION

1. Field of the Invention

The present inventions generally relate to imaging technology such as wide-angle video, and more specifically to manipulating images or views within such imaging technology.

2. Description of Background Art

A new class of camera replaces the mechanical PTZ mechanisms by a wide-angle optical system and image processing as discussed in U.S. Provisional Applications 60/467, 588, 60/467,644 and 60/467,705. This camera monitors a wide field of view and selects a plurality of regions from it to transmit to a base station either in analogue or digital form. In this way it emulates the behavior of a mechanical PTZ camera while also providing a full panoramic view for situational awareness. The wide-angle optics introduce distortion into the captured image, and an in-camera transformation engine is preferably used to correct the distortion and convert it to a view that has the same perspective as a mechanical PTZ camera.

A typical video surveillance environment will frequently contain moving objects such as pedestrians. A difficulty arises when an operator wishes to control the tilt of a PTZ camera to track an object that moves through a point directly below the camera. If the camera cannot automatically compensate for this occasion, then the output image will appear reversed as the camera tilts beyond the vertical position. The U.S. Pat. No. 5,627,616 discloses a camera comprising of an auto-pivot means for automatically rotating a mechanical PTZ camera about the pan axis by 180 degrees, hence enabling a moving object to be tracked without the image on the monitor being upside-down.

The present innovations present a system and method for implementing automatic pivoting functionality on a wide-angle video camera with electronic PTZ capability.

Automatic Pivoting in a Wide-Angle Video Camera

In one example, the present innovations are embodied as a wide-angle video camera system that automatically pivots at least a portion, or a modified portion, of a preferably wide-angle view under certain conditions. For example, in one preferred embodiment, a region of interest (RoI) is selected and tracked by an electronic PTZ capability of the wide-angle camera. If the RoI moves through a pre-determined course, (for example, if the center of the RoI is tilted through a direction which is perpendicular to the plane of the camera mounting), then the output image is automatically rotated by 180 degrees about an axis. In other embodiments, control circuitry temporarily reverses the interpretation of the tilt axis from the PTZ controls, thereby allowing the virtual view to tilt uninterrupted in the same direction past the auto-pivoting point.

These and other embodiments of the present innovations are described more fully below.

The disclosed innovations, in various embodiments, provide one or more of at least the following advantages:

Preferably has the effect of making an image that would otherwise be "up side down" from a human visual perspective to be "right side up;"

Smooth, uninterrupted movement past the auto-pivoting point;

Non-mechanical manipulation of a view requires fewer working parts;

Non-mechanical manipulation is faster than mechanical movement.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
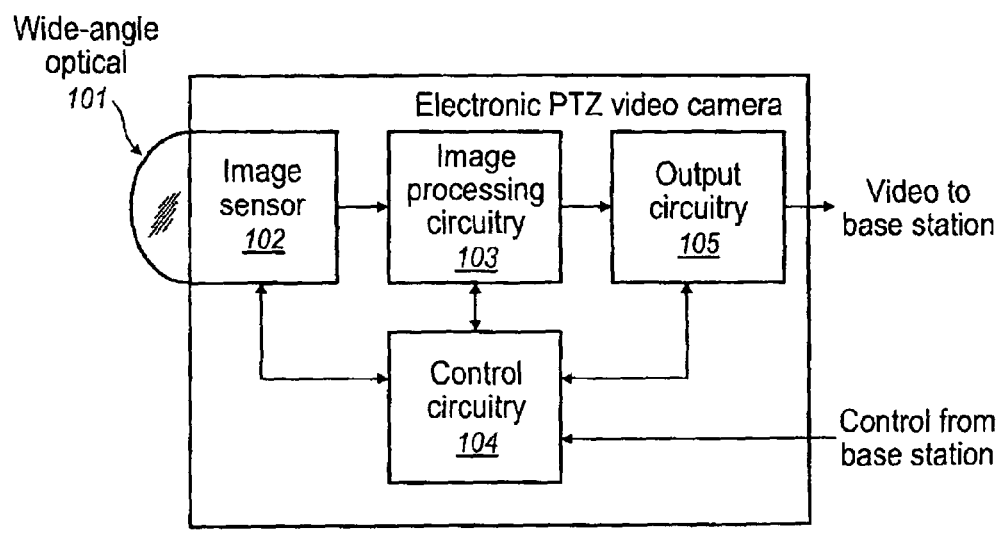
FIG. 1 shows a camera system consistent with implementing a preferred embodiment of the present innovations.

The numerous innovative teachings of the present application will be described with particular reference to the presently preferred embodiment (by way of example, and not of limitation).

The wide field of view camera described in the U.S. patent application Ser. No. 60/467,588 entitled "Multiple View Processing in Wide-Angle Video Camera" by Dr Y. Ahiska (hereby incorporated by reference) has the capability of extracting a plurality of stereographically projected images from a distorted wide-angle image captured by the camera via an internal transformation engine. This camera enables the operator at a base station to select and extract a view of a Region-of-Interest (RoI) by means of remote PTZ control. Moving coordinates of the RoI under remote control has the effect of panning and/or tilting. Further if the image sensor in the wide-angle camera is sufficiently high resolution then making the RoI smaller gives the effect of increasing magnification or alternatively increasing the size of the RoI has the effect of reducing magnification. The stereographic projection algorithm is described in the U.S. Application Ser. No. 60/467,705 entitled "Correction of optical distortion by image processing", hereby incorporated by reference.

U.S. patent application Ser. No. 60/467,643 "Multiple object processing in wide-angle video camera" by Yavuz Ahiska (hereby incorporated by reference) describes a programmable wide-angle camera which internally executes intelligent video processing algorithms on the wide-angle image to provide in-camera tracking capability and meta files for further processing. The invention disclosed in U.S. provisional patent application Ser. No. 60/497,044 entitled "Tracking Moving Objects in Video Using Wavelet Domain Information" (hereby incorporated by reference) performs moving object detection and object tracking algorithms on the whole of a high resolution wide-angle image by analyzing the compressed form of the image. Automatic moving object detection and object tracking capability of the wide field of view camera can define a RoI in the wide-angle scene monitored by the camera to contain the object in question. As this RoI will be of interest in many security applications, the object can be tracked by the electronic PTZ capability of the camera.

In a preferred embodiment, the present innovations are embodied in a "virtual" camera, such as a view extracted from a wide-angle camera with electronic PTZ control. Some PTZ movements are difficult to achieve in mechanical systems, such as tilting beyond 90 degrees from the horizontal plane. Such tilting inverts the image relative to the normal human perspective. The present innovations provide a way for automatically correcting the inversion at appropriate times, such as when the cosine of the angle becomes negative or the region of interest passes through a predetermined location or movement. Automatically inverting the image contributes to user friendliness of the system. In some embodiments, other features are included, such as auto-reversal of the input controls for moving the region of interest, or filters or delays so that repeated inversions do not occur if, for example, an object or region of interest is nearly straight below the camera.

The automatic pivoting method disclosed in this invention can be implemented in the camera disclosed in U.S. patent "Multiple View Processing in Wide-Angle Video Camera", for example, as depicted in FIG. 1. This implementation is only intended to serve as an illustrative example, and is not intended to be the only context consistent with implementing the present innovations.

The wide-angle optical system 101 in conjunction with the image sensor 102 captures an image that is passed to the image processing circuitry 103 for color processing filtering and other functions, such as stereographic projection. As disclosed in 60/467,705 the distortion may be arbitrarily complex. The distortion is projected through the use of tables that define the necessary mapping. The image processing circuitry 103, which has a memory, can be comprised of either one or a group of processors coupled with a high bandwidth bus to increase the available processing capability. The digital sensor data is sent to the image processing circuitry 103 which is also responsible for debayering, color equalization and color balancing of the image. Characteristics of the image sensing 102, such as the exposure and aperture, and the image processing 103 can be controlled by the control circuitry 104.

The control circuitry resident in the wide-angle camera 104 acts on a resident software program and from base station control. The control from the base station can be any standard, including RS485 or TCP/IP format. In one example embodiment consistent with the present innovations, when the center point of the video image of a selected view (preferably a stereographically projected view) is tilted through a direction which is perpendicular to the plane of the camera mounting (i.e. vertically down when mounted to a ceiling) then the output image of the RoI (or the RoI at another processing phase) is automatically rotated by 180 degrees (or some angle) about the pan axis by the transformation engine. Other conditions when the image may be flipped are mentioned below.

Further the control circuitry 104 can (in preferred embodiments) temporarily reverse the interpretation of the tilt axis from the PTZ controls (for example, the PTZ commands originating from a user operated joystick, or other control signals). This reversal remains in place until the motion of the view is brought to rest in the tilt direction, thereby allowing the virtual view to tilt uninterrupted in the same direction past the auto-pivoting point. The reversal can also take place until a discontinuity of any type occurs in the tilt, or until an operator or other control signals the reversal to end.

The digital output is passed to be formatted and compressed as necessary in the output circuitry 105 before being digitally output to the base station for monitoring. The preferred embodiment includes multiple compressed digital video streams. In another preferred embodiment the output from the camera is analogue video. Conversion from digital-to-analogue video and formatting can take place in the output circuitry 105. A possible embodiment includes two analogue composite video output channels.

Motion detection in the camera is preferably (but not necessarily) carried out by using the well-known background subtraction method. There are many public domain documents describing background estimation in video. Further information on said wide-angle camera's motion detection and object tracking implementations can be found in the provisional U.S. patent application "Automatically Expanding the Zoom Capability of a Wide-Angle Video Camera".

Figure 2:
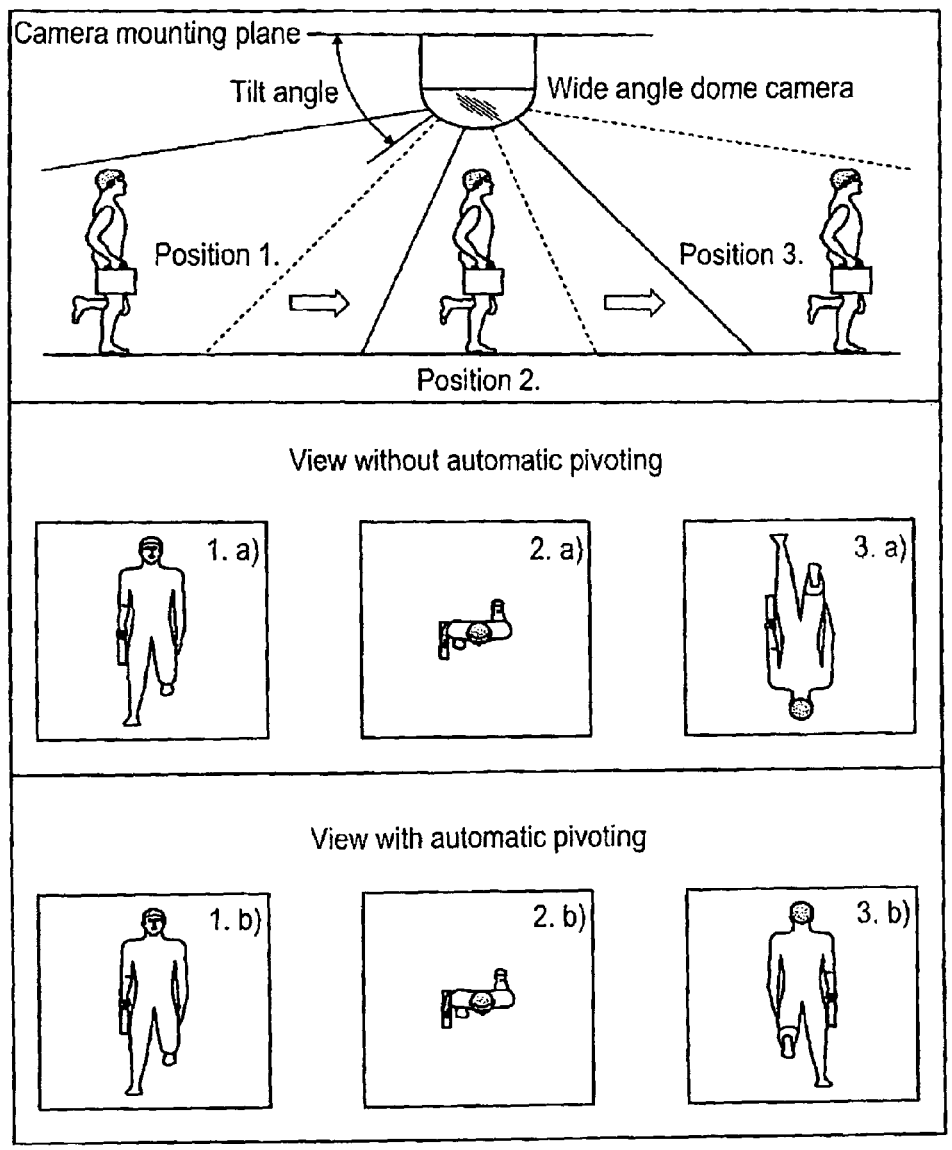
FIG. 2 depicts a moving view within a wide-angle camera view.

FIG. 2 is an illustration of the effect of automatic pivoting. A RoI tracking a moving object, in this case a person, is illustrated. The person moves from position 1 to position 3 via a position that is directly below the camera, labeled position 2. The diagrams 1 a), 2 a) and 3 a) show the screen-shots from a camera (situated above) without automatic view pivoting. After the camera passes through position 2 the image of the object can be seen to be reversed in comparison to the preferred output expected by a user.

The sequence of diagrams 1 b), 2 b) and 3 b) show the same moving object being tracked by a camera with automatic view pivoting capability consistent with a preferred embodiment of the present innovations. The object can be seen to be in the correct orientation at all times due to the image rotation which takes places after the RoI passes through position 2.

It is noted that the conditions for image rotation can vary within the scope of the present innovations. Some examples include, but are not limited to, rotating the image when the RoI passes through a point such that the electronic PTZ of the RoI is (or passes through) the vertical; when the RoI passes through a predetermined angle; when the RoI passes through a vertical plane substantially perpendicular to the RoI's direction of motion; when the RoI moves from one pre-defined sector into another pre-defined sector; or under other circumstances wherein the image would become inverted or substantially inverted relative to a human viewpoint.

Figure 3:
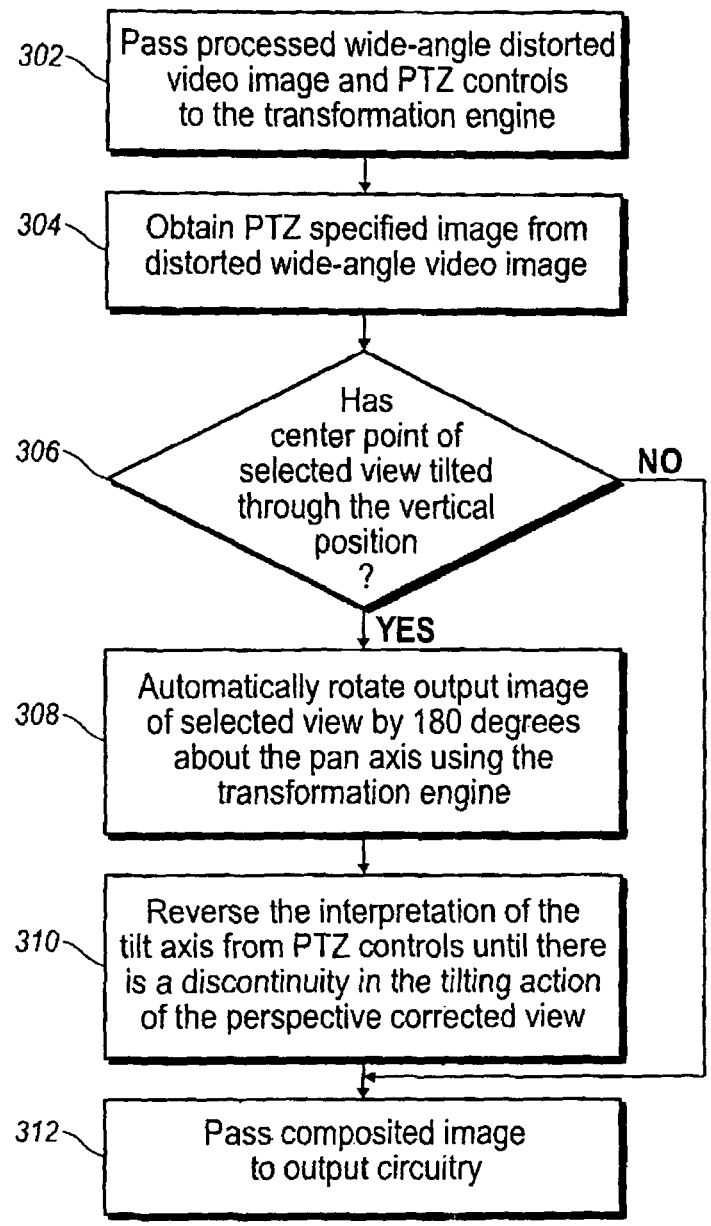
FIG. 3 shows process steps consistent with implementing preferred embodiments of the present innovations.

FIG. 3 shows an example set of steps consistent with implementing a preferred embodiment of the present innovations. It is noted that the specific steps outlined below are not the only possible implementation. Preferably, the present innovations include a process of automatically pivoting a view (preferably a stereographically projected view) in the processing cycle of a wide-angle camera, such as the camera as disclosed in U.S. patent application "Multiple View Processing in Wide-Angle Video Camera", referenced above. In other implementations, various steps in the innovative process can be distributed outside the camera, such as in a remote control station.

First, the captured wide-angle video image (possibly after some processing) and PTZ control signals are passed to the transformation engine (step 302). The PTZ specified image is obtained from the wide-angle video image (step 304). Next, a determination is made as to whether the conditions are fulfilled for rotating the image. In this example, the determination is made depending on whether the center point of the selected view (e.g., the RoI) has tilted through the vertical position (step 306). If it has not, then the image is simply passed to the output circuitry (after possibly other processing, if necessary) (step 312). If the image has fulfilled the necessary condition, then the selected view of the output image is rotated by 180 degrees, for example, about the pan axis using the transformation engine (step 308). In preferred embodiments, the process continues by reversing the interpretation of the tilt axis from the subsequent PTZ controls until there is a discontinuity in the tilting action of the view (step 310). The image is then passed to the output circuitry (step 312).

There are of course several ways to implement the present innovations. For example, the determination of when or whether to "flip" the view can be made depending on various factors, including but not limited to the factor of whether the center point of the selected view has tilted through the vertical position. For example, the view could be rotated if any part of the region of interest passes through the vertical position, or if any part of the region of interest passes through any other pre-determined movement, including but not limited to a specific predetermined angle or other series of movement, another point in the hemisphere, based on an operator's control input, or other factors. In embodiments in which a region of interest is not used (e.g., in non-wide-angle view systems), other parameters can be used to determine when the images are rotated or flipped.

According to a disclosed class of innovative embodiments, there is provided: A method of electronically pivoting a view in a wide-angle video camera comprising the steps of: capturing a distorted wide-angle video image using a wide-angle camera which is capable of extracting a plurality of views via a transformation engine within the camera under remote PTZ control; and automatically rotating image by 180 degrees about the pan axis by said transformation engine when a view is tilted by said remote PTZ control through a preset angle.

According to a disclosed class of innovative embodiments, there is provided: A computer readable medium containing programming instructions for pivoting views in a wide-angle video camera comprising the steps of: capturing a distorted wide-angle video image using a wide-angle camera which is capable of extracting a plurality of views via a transformation engine within the camera under remote PTZ control; and automatically rotating image by 180 degrees about the pan axis by said transformation engine when a view is tilted by said remote PTZ control through a preset angle.

According to a disclosed class of innovative embodiments, there is provided: A method of manipulating a view from a wide-angle video camera, comprising the steps of: capturing a wide-angle view; designating a first region of the wide-angle view; when the first region moves through a predetermined angle, rotating the first region.

According to a disclosed class of innovative embodiments, there is provided: A wide-angle video camera system, comprising: a wide-angle input for capturing wide-angle view, the wide-angle view including a first region; a transformation engine; wherein when the first region of the wide angle view moves in a predetermined way, the first region is automatically rotated.

According to a disclosed class of innovative embodiments, there is provided: A method for viewing images in accordance with viewing parameters, comprising the actions of: in response to view angle selection inputs, extracting and transforming a selected portion from a wide-angle image; and automatically flipping said selected portion to correct for inverted views.

According to a disclosed class of innovative embodiments, there is provided: A method for viewing images in accordance with viewing parameters, comprising the actions of: a) extracting and transforming one or more selected portions from an ultra-wide-angle transformed image, to provide an image which is not ultra-wide angle and which emulates a virtual camera's operation; b) in response to view selection inputs, changing parameters for said step a), to thereby emulate movements of the virtual camera; and c) automatically correcting vertical inversion of said transformed image.

According to a disclosed class of innovative embodiments, there is provided: A method for following regions of interest in a virtual-camera view which is extracted from an ultra-wide-angle image sequence, comprising the actions of: responding to view angle selection inputs, and when the view angle selection inputs command a tilt value beyond about 90 degrees, then automatically flipping said the virtual-camera view to correct for inversion.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, the conditions under which a view from the wide-angle camera would be rotated can vary. The specific conditions which must be fulfilled do not limit the invention, which is intended to cover any condition under which the view is rotated.

Though preferred embodiments are described in terms of a RoI, some implementations may not included a separately defined RoI.

The present innovations can also be implemented in other camera systems, beside the example provided in this description. The various stages of processing circuitry, their location and implementation, and other aspects of the example systems described herein can also of course be varied within the scope of the innovative concepts described.

Additional general background, which helps to show variations and implementations, may be found in the following publications, all of which are hereby incorporated by reference: U.S. Application Ser. No. 60/467,643 entitled "Multiple Object Processing in Wide-Angle Video Camera", which is hereby incorporated by reference. U.S. Application Ser. No. 60/467,588 entitled "Multiple View Processing in Wide-Angle Video Camera", which is hereby incorporated by reference. U.S. Application Ser. No. 60/467,644 entitled "Method of simultaneously displaying multiple views for Video Surveillance", which is hereby incorporated by reference. U.S. Provisional Application Ser. No. 60/497,044, entitled "Tracking Moving Objects in Video Using Wavelet Domain Information," by A. E. Cetin and Y. Ahiska, which is hereby incorporated by reference. U.S. Application Ser. No. 60/467,705 entitled "Correction of optical distortion by image processing", which is hereby incorporated by reference. U.S. Provisional Application 60/553,186, entitled "Wide angle electronic camera with improved peripheral vision", which is hereby incorporated by reference. U.S. Non-provisional application Ser. No. 11/184,720 filed Jul. 19, 2005 entitled "Automatically Expanding the Zoom Capability of a Wide-Angle Video Camera", which is hereby incorporated by reference. U.S. Provisional Application 60/589,104 filed Jul. 19, 2004. U.S. Provisional application Ser. No. 11/183,566 filed Jul. 18, 2005.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method of automatically pivoting a view in a stationary overhead mounted wide-angle video camera comprising the steps of:
    capturing a wide-angle image using the stationary overhead mounted wide-angle video camera which does not have any pan or tilt movement;
    automatically generating a virtual camera view from a virtual camera, which is not a physically moveable camera, corresponding to a portion of said stationary overhead mounted wide-angle image via a transformation engine within the video camera, wherein said virtual camera view corresponds to a PTZ state in a generated transformed image; and
    automatically generating a 180 degrees pan control to steer said virtual camera view when virtual camera view tilts beyond a preset tilt angle.

2. A method as recited in claim 1 wherein said preset tilt angle is approximately 90 degrees from the ceiling plane.

3. A method as recited in claim 1 wherein said video camera has a fish eye lens, or a purpose designed lens to amplify peripheral visions.

4. A method as recited in claim 1 wherein the interpretation of the tilt axis in said PTZ control is temporarily reversed after said automatic virtual camera panning until the tilt action is completed.

5. A method as recited in claim 1 wherein said automatic virtual camera pan is achieved by altering pan and/or tilt coordinates.

6. A method as recited in claim 1 wherein the PTZ state is generated by an external operator.

7. A method as recited in claim 1 wherein the PTZ state is generated locally based on computation on said wide-angle image involving automatic motion analysis, which may include motion detection, moving region tracking or object tracking.

8. A method as recited in claim 1 wherein a generated transformed image is based on stereographic projection or perspective correction.

9. A method as recited in claim 1 wherein said video camera is capable of generating a plurality of generated transformed views and wherein each transformed view has an associated PTZ state.

10. A non-transitory computer readable data storage medium containing programming instructions for pivoting views in a stationary overhead mounted wide-angle video camera comprising the steps of:
    capturing a wide-angle video image using the stationary overhead mounted wide-angle video camera which does not have any pan or tilt movement;
    using external or PTZ control generated within said video camera to determine the PTZ state of a virtual camera which is not a physically moveable camera;
    automatically generating a transformed view of portion of said stationary overhead mounted wide-angle image via a transformation engine within the camera, wherein said transformed view corresponds to said PTZ state; and
    automatically generating a 180 degrees control when said PTZ state tilts beyond a preset tilt angle.

11. A non-transitory medium as recited in claim 10 wherein said video camera has a fish eye lens, or a purpose designed lens to amplify peripheral visions.

12. A non-transitory medium as recited in claim 10 wherein said PTZ control is generated by an external operator.

13. A non-transitory medium as recited in claim 10 wherein said PTZ control is generated locally based on computation on said wide-angle image involving automatic motion analysis, which may include motion detection, moving region tracking or object tracking.

14. A non-transitory medium as recited in claim 10 wherein said transformed views are based on stereographic projection or perspective correction.

15. A method for viewing images in accordance with viewing parameters, comprising the actions of:
    a) extracting and transforming one or more selected portions from a stationary overhead mounted wide angle image, to provide a transformed image using internal image processing circuitry;
    b) in response to view selection inputs selecting a portion of the image as a region of interest, changing parameters for said step a), to thereby emulate movements of a mechanical PTZ camera using internal image processing circuitry to automatically generate a virtual camera which is not a physically moveable camera and which also does not have any physical pan or tilt movement but performs virtual PTZ movement; and
    c) automatically correcting vertical inversion of said transformed image in a virtual rotation image transformation using internal circuitry.

16. A method of automatically pivoting a view in a overhead mounted stationary wide-angle video camera comprising the steps of:
    capturing a wide-angle image using a stationary overhead mounted wide-angle video camera which does not have any pan or tilt movement;
    automatically generating one or more transformed views of at least a portion of said wide-angle image via a transformation engine in said video camera, wherein each transformed view has an associated PTZ state; and
    if necessary, automatically rotating said one or more transformed views to ensure that said views are not inverted;
    wherein a portion or whole of an output from said stationary overhead mounted wide-angle video camera is based on said transformed views.

17. A method as recited in claim 16 wherein said rotation is applied when said PTZ state represents a view tilted at an angle is approximately 90 degrees from the ceiling plane.

18. A method as recited in claim 16 wherein said video camera has a fish eye lens, or a purpose designed lens to amplify peripheral visions.

19. A method as recited in claim 16 wherein said PTZ state is modified based on control signals issued by an external operator.

20. A method as recited in claim 16 wherein said PTZ state is modified based on local computation on the wide-angle image involving automatic motion analysis, which may include motion detection, moving region tracking or object tracking.

21. A method as recited in claim 16 wherein said transformed views are based on stereographic projection or perspective correction.

22. A method as recited in claim 16 wherein said camera is table mounted.

23. A wide-angle video camera system, comprising:
    a stationary overhead mounted wide-angle video camera, which does not have any physical pan or tilt movement, capable of capturing a wide angle image;
    said stationary overhead mounted wide-angle video camera capable of automatically generating a transformed view of at least one portion of said wide-angle image via a transformation engine within the camera, wherein said transformed view corresponds to a PTZ state which is based on external or locally generated PTZ control; and automatically generating a 180 degree pan control when said PTZ state changes in a predetermined way;

wherein a portion or whole of an output from said camera is based on said transformed view.

24. A system as recited in claim 23 wherein said stationary wide-angle video camera has a fish eye lens, or a purpose designed lens to amplify peripheral visions.

25. A system as recited in claim 23 wherein said PTZ control is generated by an external operator.

26. A system as recited in claim 23 wherein said PTZ control is generated locally based on computation on said wide-angle image involving automatic motion analysis, which may include motion detection, moving region tracking or object tracking.

27. A system as recited in claim 23 wherein said transformed view is based on perspective correction or stereographic projection.

28. A method of automatically pivoting a view in a overhead mounted wide-angle video camera comprising the steps of:

capturing a wide-angle image using a stationary overhead mounted wide-angle video camera, which does not have any physical pan or tilt movement;

using external or internal PTZ control generated within said camera to generate an internal PTZ state in said camera;

automatically generating a transformed view of at least one portion of said stationary overhead mounted wide-angle image via a transformation engine within the camera, wherein said transformed view corresponds to said PTZ state; and automatically generating a 180 degree pan control when said PTZ state tilts beyond a preset tilt angle.

* * * * *